United States Patent
Wu

(10) Patent No.: US 7,670,718 B2
(45) Date of Patent: Mar. 2, 2010

(54) BATTERY ASSEMBLY

(75) Inventor: Donald P. H. Wu, Sinfong Township, Hsinchu County (TW)

(73) Assignee: Energy Control Limited, Tortola (VG)

( * ) Notice: Subject to any disclaimer, the term of this patent is extended or adjusted under 35 U.S.C. 154(b) by 343 days.

(21) Appl. No.: 11/850,665

(22) Filed: Sep. 5, 2007

(65) Prior Publication Data

US 2009/0061298 A1    Mar. 5, 2009

(51) Int. Cl.
*H01M 2/34* (2006.01)
*H01M 2/20* (2006.01)

(52) U.S. Cl. .................. 429/151; 429/152; 429/153; 429/158; 429/159; 429/160; 429/99

(58) Field of Classification Search ......... 429/151–159, 429/99
See application file for complete search history.

(56) References Cited

U.S. PATENT DOCUMENTS

| | | | | |
|---|---|---|---|---|
| 4,065,603 A | * | 12/1977 | Coibion | 429/99 |
| 5,993,993 A | * | 11/1999 | Hall | 429/163 |
| 2005/0084748 A1 | * | 4/2005 | Miller et al. | 429/99 |
| 2005/0255379 A1 | * | 11/2005 | Marchio et al. | 429/153 |
| 2006/0127754 A1 | * | 6/2006 | Hamada et al. | 429/158 |
| 2007/0099073 A1 | * | 5/2007 | White et al. | 429/158 |
| 2007/0184339 A1 | * | 8/2007 | Scheucher | 429/99 |
| 2007/0190409 A1 | * | 8/2007 | Sakurai | 429/159 |
| 2008/0057393 A1 | * | 3/2008 | Onuki et al. | 429/159 |
| 2008/0260088 A1 | * | 10/2008 | Singh et al. | 376/272 |

* cited by examiner

*Primary Examiner*—Patrick Ryan
*Assistant Examiner*—Ladan Mohaddes
(74) *Attorney, Agent, or Firm*—Banger Shia

(57) ABSTRACT

A Battery Assembly comprises a rack assembly, a plurality of guiding strips, two polar heads, a plurality of lithium batteries and safety units. The guiding strips are connected to the polar heads and are disposed on the rack assembly, respectively. The rack assembly has a containing space for accommodating the lithium batteries, and each lithium battery is connected to the guiding strip by a guiding piece via one safety unit, such that the lithium batteries are connected in parallel, thus providing enough power with a small size. In addition, each safety unit can cut off the broken lithium battery separately, so as to avoid the immediate shut-off of the electric power.

6 Claims, 6 Drawing Sheets

BATTERY ASSEMBLY

BACKGROUND OF THE INVENTION

1. Field of the Invention

The present invention relates to a power battery assembly, and more particularly to an independent separating type power battery assembly which utilizes a rack assembly and a plurality of guiding strips to enable a plurality of lithium batteries to be connected in parallel, and utilizes a plurality of safety units to cut off the broken lithium batteries to avoid the immediate shut-off of the electric power.

2. Description of the Prior Art

Power battery assembly is the battery equipment for providing power to mechanism, and the power battery assembly must has high voltage and big current, such that the power battery assembly can effectively drive the mechanism. And as the only energy to drive the mechanism, the use of power battery assembly is very important to the mechanism.

A plurality of batteries of a conventional power battery assembly is installed in a box after the batteries are connected in parallel, and both ends of the circuit are connected to two polar heads by the parallel circuit, respectively. The polar heads provide high voltage and big current to the mechanism, and produce enough power. The conventional power battery assembly is usually used to the equipments such as the electric vehicle, the mobile machine, and the remote control machine. However, the conventional power battery assembly still has the following disadvantages:

Firstly, since the plurality of batteries in parallel connection is installed in one box, the parallel circuit is complex. And with the increase of the batteries, the number of the parallel circuits will be multiplied. As a result, the wires will occupy too much space, and this is the main reason why the electric power of the conventional power battery assembly is difficult to improve.

Secondly, if any of the batteries is broken, which will not only produce excessive current to destroy the circuit equipment of the mechanism, but also will produce high heat to cause serious dangers.

To improve the above-mentioned problems, another power battery assembly assembled with a fuse is developed, which is fixed to an end of the parallel circuit. When a great current occurs, the fuse will cut off the electric power of the whole battery box immediately, so as to avoid producing high heat or high current, thus improving the security. However, such a power battery assembly will cause other problems.

Since the fuse will cut off the electric power of the whole battery box immediately when a great current is produced, the power will disappear immediately. As a result, the electric vehicle stops at the center of the road, the mobile machine stops at the hazardous area, and the remote control machine loses the return power. The only solution to the above-mentioned problem is to provide a spare battery system simultaneously, but such a spare battery system will increase the cost and occupy too much space.

Therefore, a brand-new independent separating type power battery assembly is improved in terms of reducing the failures and saving the installing space.

The present invention has arisen to mitigate and/or obviate the afore-described disadvantages.

SUMMARY OF THE INVENTION

The primary objective of the present invention is to provide an independent separating type power battery assembly which solves the conventional problem of security caused by the breaking of a single battery.

To achieve the objective of the present invention, a rack assembly cooperates with a plurality of guiding strips to accommodate a plurality of lithium batteries, and each lithium battery is connected to the guiding strips by a guiding piece via a safety unit. So each lithium battery of the present invention has one safety unit.

The rack assembly and the guiding strips enable the lithium batteries to be connected in parallel, and each safety unit can cut off the broken lithium battery separately, so as to prevent the dangers produced by the immediate shut-off of the electric power or termination of the power.

The second objective of the present invention is to provide an independent separating type power battery assembly which not only can produce high voltage and big current, but also can solve the conventional problem of occupying too much space.

To achieve the objective of the present invention, a rack assembly cooperates with a plurality of guiding strips to form a containing space for accommodating a plurality of lithium batteries, and the guiding strips serve to transmit the parallel electric power to two polar heads.

The cooperation of the rack assembly with the guiding strips enables the lithium batteries to be connected in parallel. In addition, the lithium batteries are arranged in the containing space tightly, thus providing enough power with a small volume.

It is to be noted that the guiding strips can be connected to the polar heads by connecting wires or directly.

In addition, when the guiding strips are arranged orderly in turns: such as positive pole, negative pole and so on, between the positive guiding strip and the negative guiding strip is disposed an insulator for separating the guiding strips. The insulator can be made of insulating material and can be sheet-shaped, plate-shaped, or cover-shaped. And the guiding strips and the polar heads can be made of conductive metal material such as copper, silver, nickel, and cadmium.

The guiding pieces can be made of copper, or nickel, or gold, or silver.

The above-mentioned rack assembly, guiding strips, lithium batteries, insulator and safety units can be fixed by the methods of locking, welding, or covering.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 1:
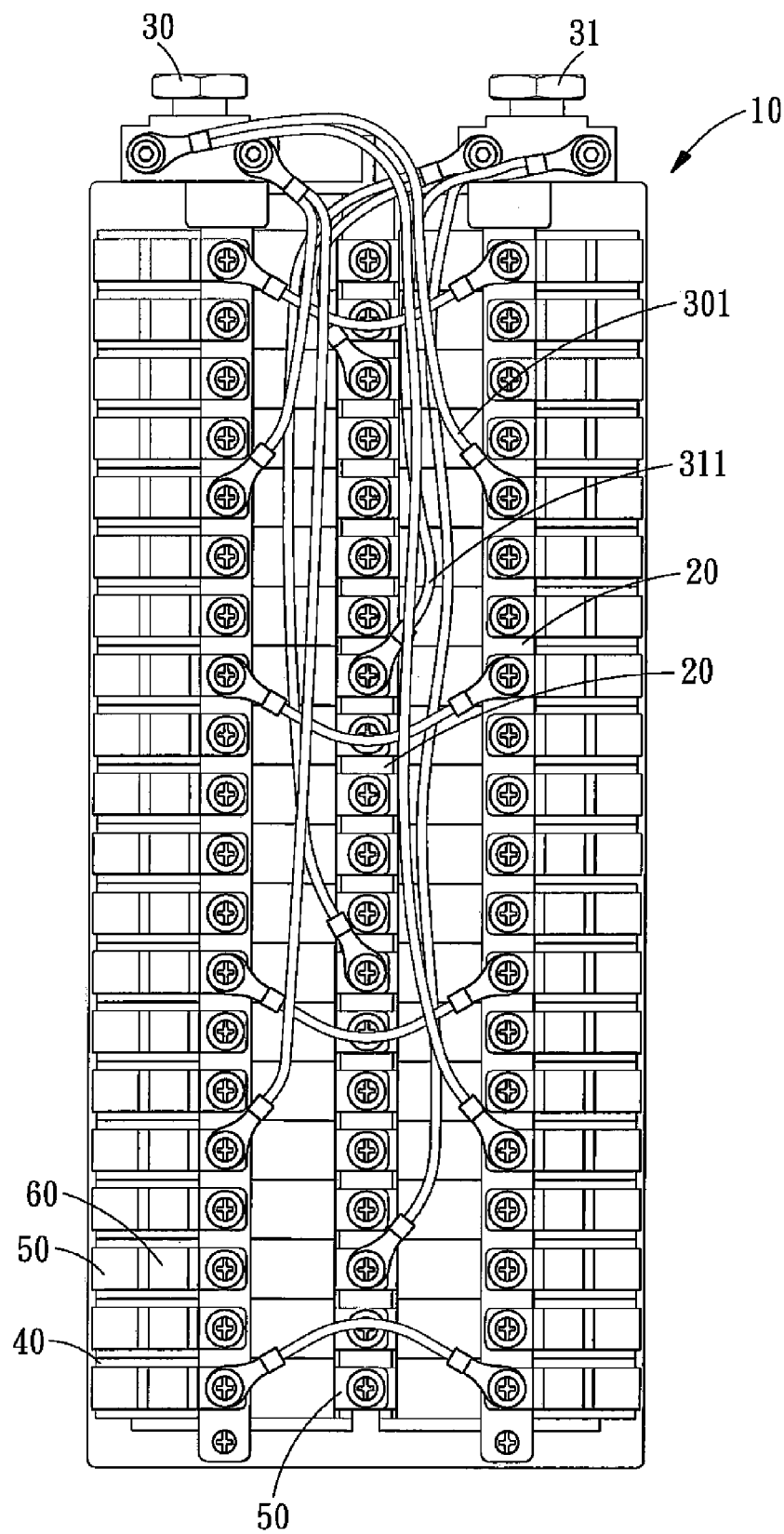
FIG. 1 is a front view of an independent separating type power battery assembly in accordance with the present invention.
Figure 2:
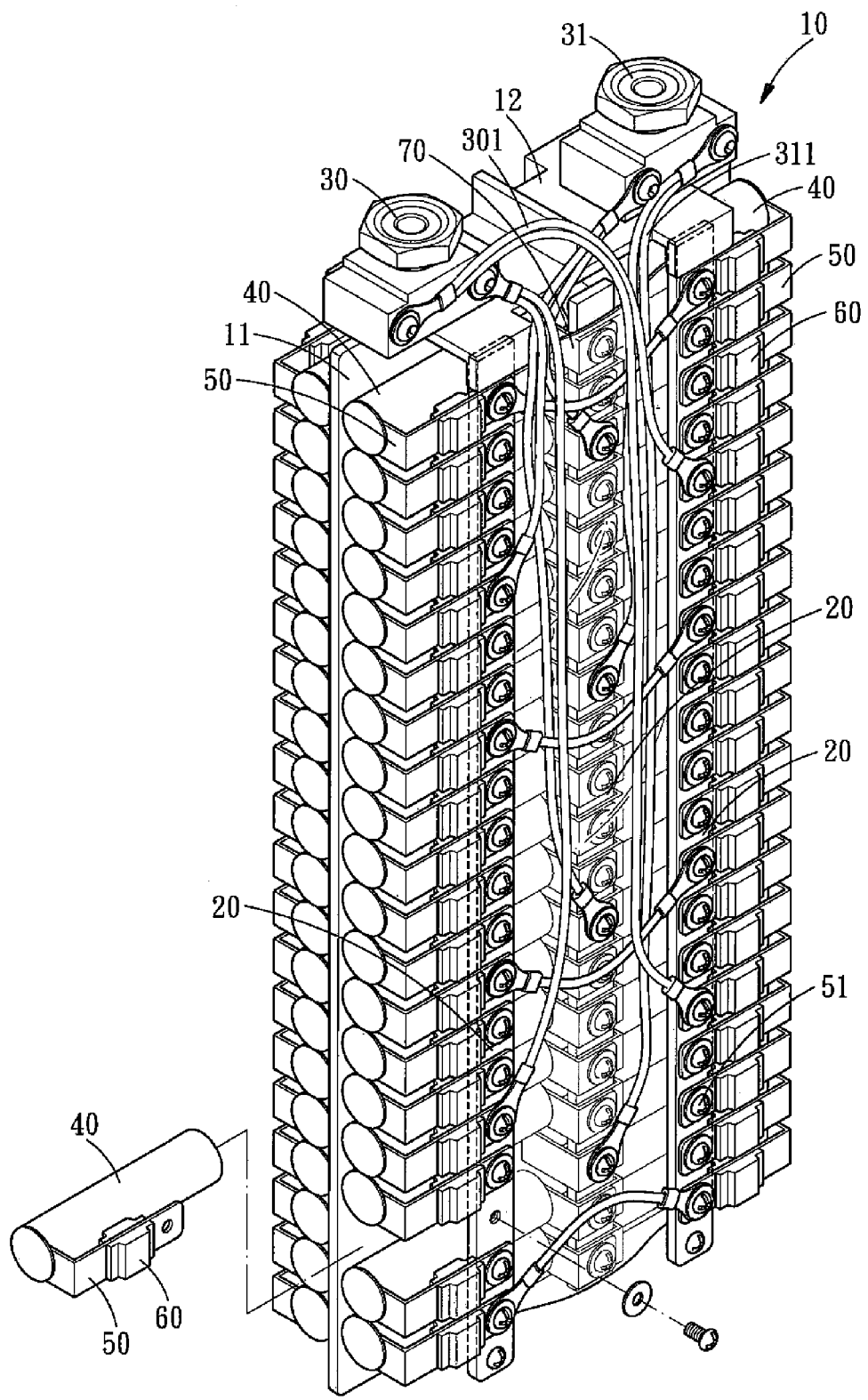
FIG. 2 is a perspective view of the independent separating type power battery assembly in accordance with the present invention.
Figure 3:
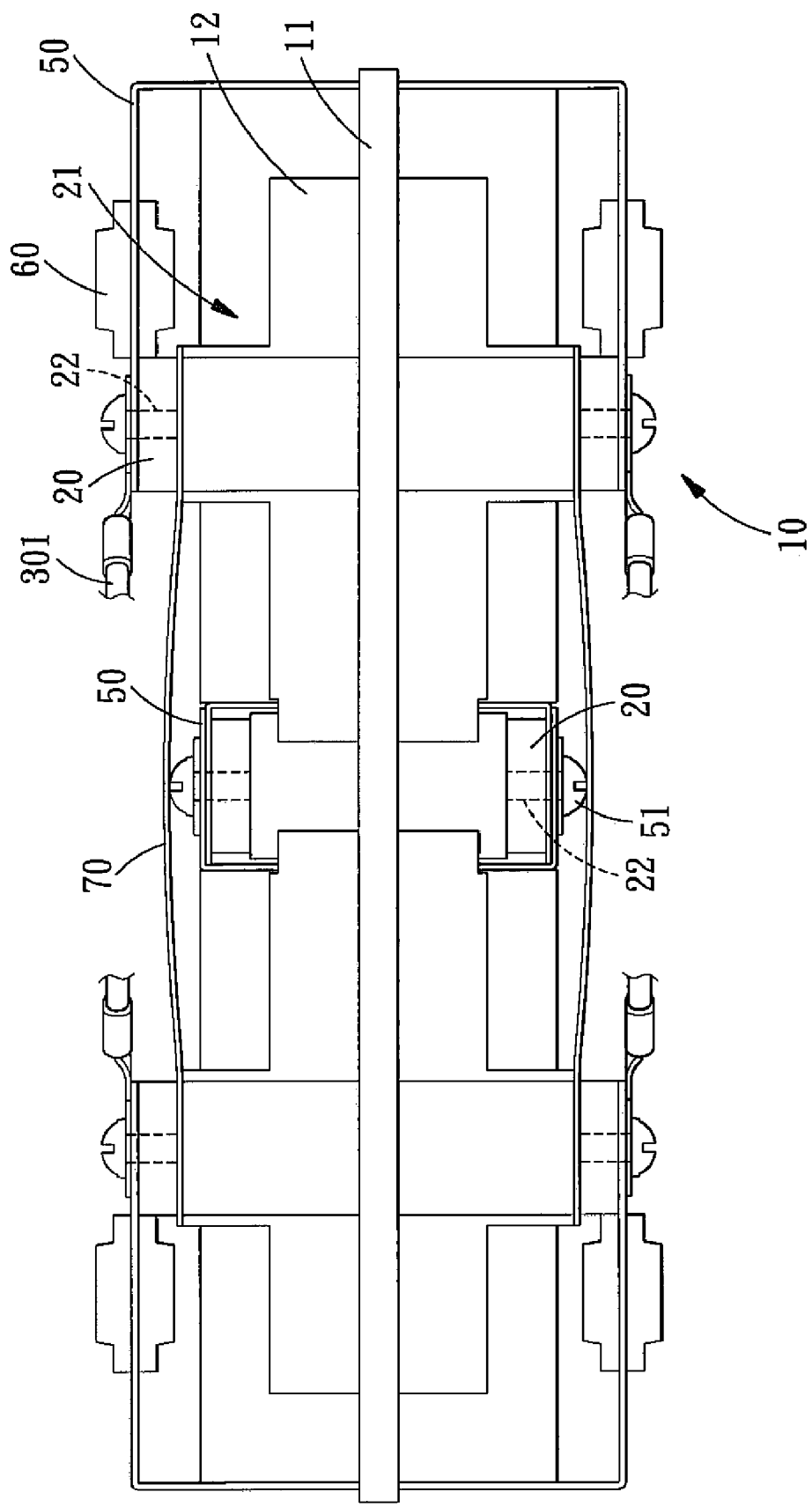
FIG. 3 is a side view of the independent separating type power battery assembly in accordance with the present invention.

Referring to FIGS. 1-3, an independent separating type power battery assembly in accordance with the present invention comprises a rack assembly 10, six guiding strips 20, two polar heads 30 and 31, a plurality of lithium batteries 40, a plurality of guiding pieces 50, a plurality of safety units 60, and a plurality of insulators 70.

The rack assembly 10 is I-shaped and is integrally formed by a separating plate 11 and two side racks 12, and each side rack 12 is defined with three threaded holes.

Each guiding strip 20 is made of metal with high conductivity, and both ends of each guiding strip 20 are locked in the side racks 12 at both ends of the rack assembly 10 by screws. Both sides of the rack assembly 10 are installed with three guiding strips 20, respectively, that is, a mid guiding strip 20 and two outer guiding strips 20. And a containing space 21 is formed between the three guiding strips 20 and the rack assembly 10 and is located at each side of the rack assembly 10, and each guiding strip 20 is defined with a plurality of threaded holes 22.

The polar heads 30 and 31 are installed on the side rack 12 at one end of the rack assembly 10 thereof and are connected to the guiding strips 20 by connecting wires 301 and 311, respectively.

The lithium batteries 40 are orderly arranged in the containing spaces 21 between the guiding strips 20 and the rack assembly 10, respectively. The positive pole of each lithium battery 40 faces towards the mid guiding 20, and the negative pole of each lithium battery 40 faces towards the outer guiding strips 20.

One end of each guiding piece 50 is connected to the positive and negative poles of each lithium battery 40, and the other end of each guiding piece 50 is locked in the threaded hole 22 of each guiding strip 20 by a screw 51.

Each safety unit 60 is disposed on the guiding strip 50 and is located correspondingly to each lithium battery 40, and the safety unit 60 will cut off the guiding piece 50 immediately when a great current is produced.

The insulators 70 are transparent sheets and are fixed between the guiding strips 20 connected to the positive poles of the lithium batteries 40 and the guiding strips 20 connected to the negative poles of the lithium batteries 40, so as to avoid the interference of the electric power when the positive poles are located too close to the negative poles.

The abovementioned is the structure and the location of each subassembly, and the following is an illustration of the operation of the present invention.

Figure 4:
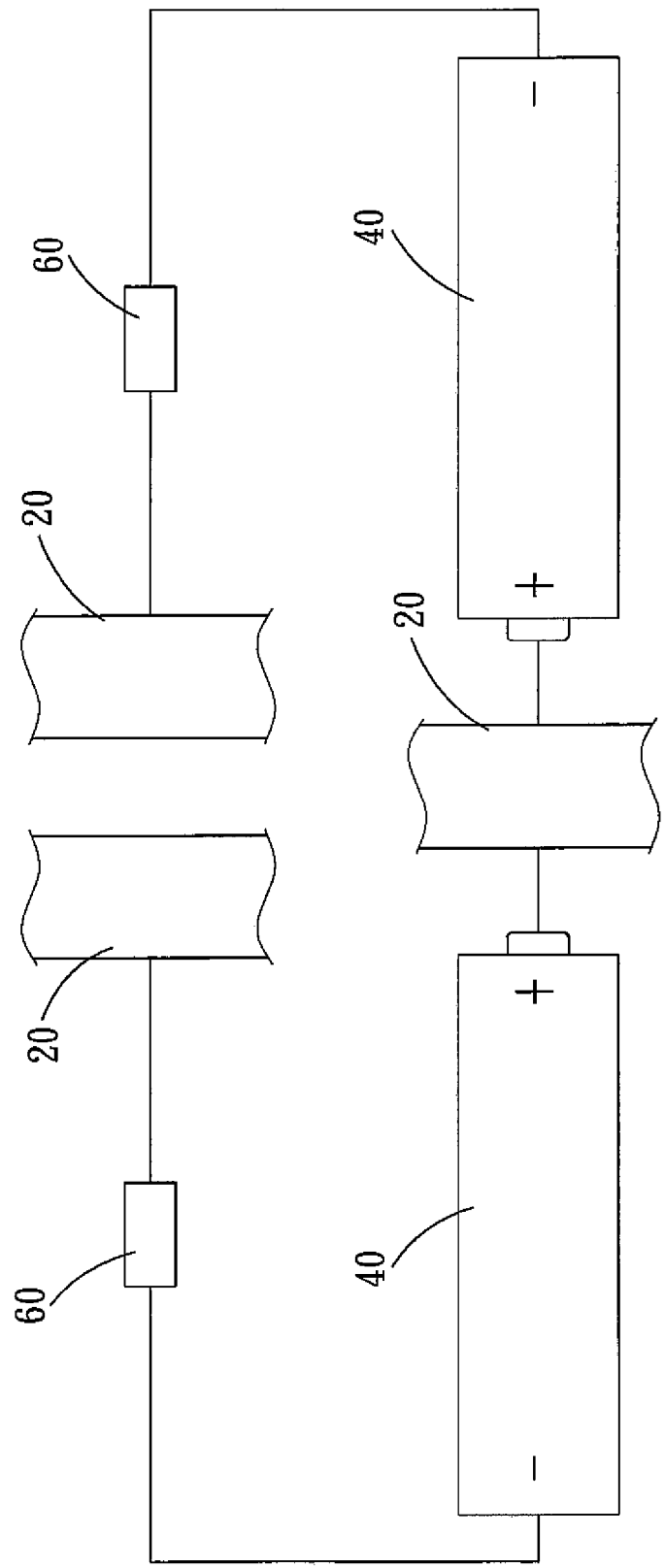
FIG. 4 is a circuit view of the independent separating type power battery assembly in accordance with the present invention.

Referring to FIG. 4, both sides of the rack assembly 10 are installed with three guiding strips 20, respectively, and the containing space 21 is formed between the three guiding strips 20 and the rack assembly 10 and is located at each side of the rack assembly 10. The lithium batteries 40 are orderly arranged in the containing spaces 21 between the guiding strips 20 and the rack assembly 10, respectively. The positive pole of each lithium battery 40 faces towards the mid guiding 20, and the negative pole of each lithium battery 40 faces towards the outer guiding strips 20. Moreover, the lithium batteries 40 are connected to the guiding strips 20 by the guiding pieces 50. By such arrangements, the cooperation of the rack assembly 10 with the guiding strips 20 enables the lithium batteries 40 to be connected in parallel. In addition, the lithium batteries 40 are arranged in the small containing spaces 21, thus providing enough power with a small volume.

Hence, the independent separating type power battery assembly of the present invention is suited to applications requiring high power source, and since its size is small, the present invention is particularly suited to the equipments: such as the electric vehicle, the motorcycle and the electric bicycle.

The key point is that one end of each guiding piece 50 is connected to the positive and negative poles of each lithium battery 40, and the other end of each guiding piece 50 is locked in the threaded hole 22 of each guiding strip 20 by the screw 51. Each safety unit 60 is disposed on the guiding strip 50 and is located correspondingly to each lithium battery 40, and the safety unit 60 will cut off the guiding piece 50 immediately when a great current is produced.

Thereby, each lithium battery 40 in parallel connection has its own safety unit 60. When any lithium battery 40 is broken or produces abnormal current, the safety unit 60 will cut off the guiding piece 50 near the lithium battery 40 immediately, that is, the safety unit 60 will cut off the circuit of the lithium battery 40 effectively. At the same time, other lithium batteries 40 in parallel connection will not be influenced, and the whole parallel electric energy can still produce enough power. Hence, the present invention can prevent the dangers produced by the immediate shut-off of the electric power or termination of the power.

Figure 5:
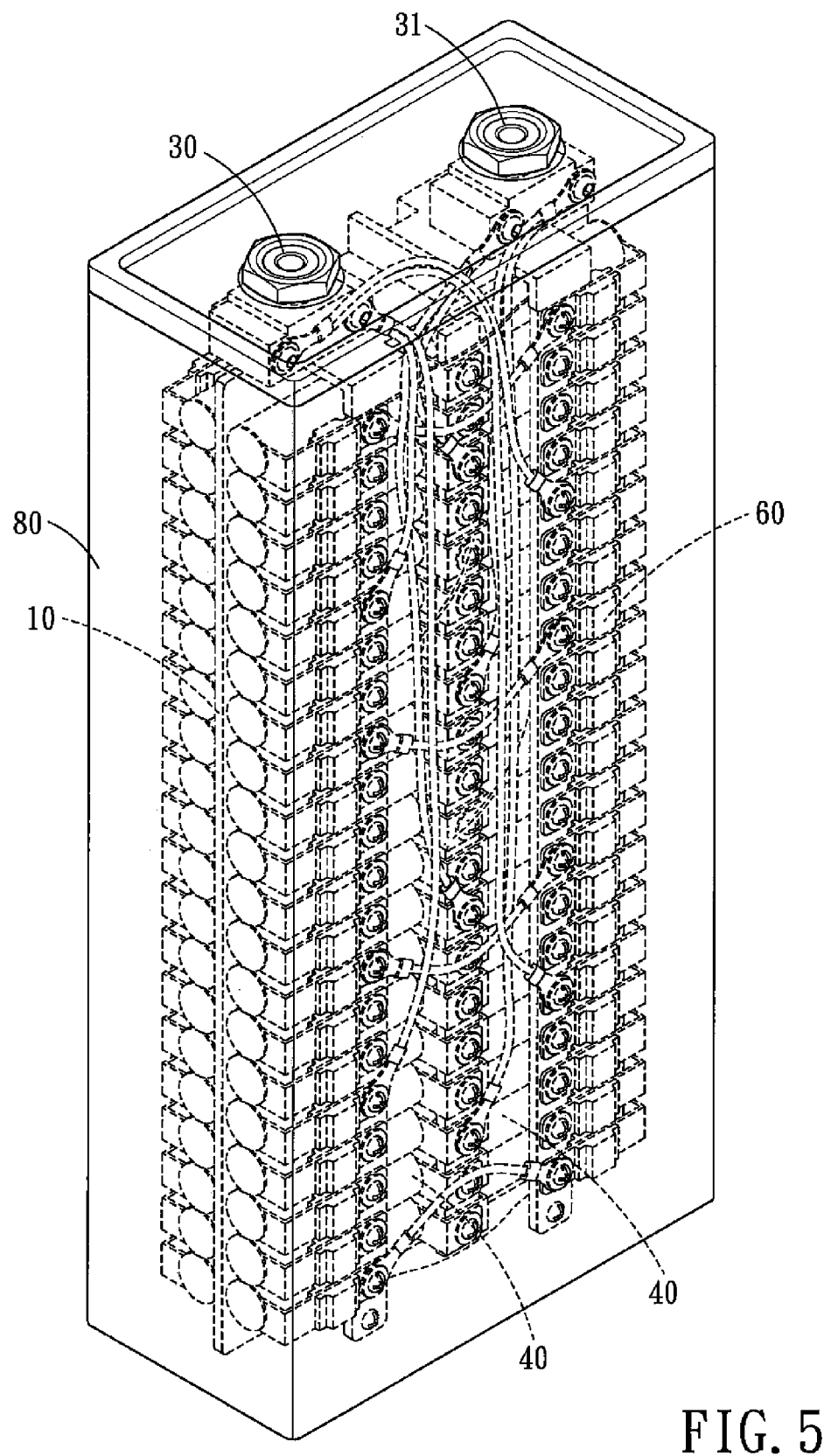
FIG. 5 is an illustrative view showing the independent separating type power battery assembly cooperates with a box.

Referring to FIG. 5, it is to be noted that the present invention can also use a box 80 to accommodate the whole rack assembly 10. And the polar heads 30 and 31 are exposed out of the box 80. Such an arrangement not only facilitates the assembly of the present invention, but also can protect the lithium batteries 40 and the safety units 60 (such as water proof, dust proof, and crash proof). In addition, the design of the screws 51 for locking the components facilitates the assembly and maintenance of the present invention.

Figure 6:
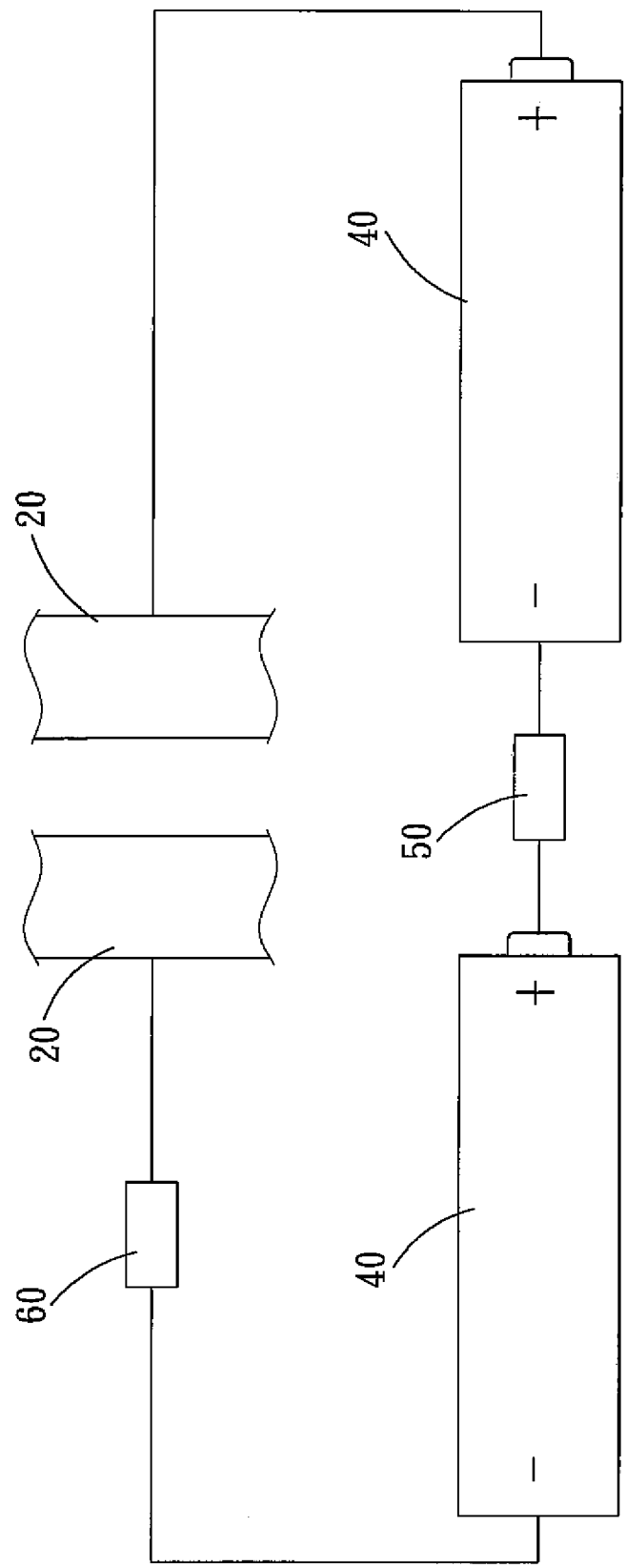
FIG. 6 is another circuit view of the independent separating type power battery assembly in accordance with the present invention.

Referring to FIG. 6, the lithium batteries 40 can be connected in pairs in series and then parallelly connected to the guiding strips 20. Since the serially connected lithium batteries 40 can be connected by the guiding pieces 50, the batteries 40 can be connected in pairs in series and then parallelly connected. By such arrangements, each two serially connected 40 can share one safety unit 60, so as to reduce the number of the safety units 60.

While we have shown and described various embodiments in accordance with the present invention, it should be clear to those skilled in the art that further embodiments may be made without departing from the scope of the present invention.

What is claimed is:

1. A battery assembly, comprising:
   a rack assembly;
   six guiding strips made of metal of high conductivity and fixed to the rack assembly, a containing space being formed between the guiding strips and the rack assembly;
   two polar heads fixed to one end of the rack assembly and connected to the guiding strips by connecting wires;
   a plurality of lithium batteries orderly arranged in the containing space between the guiding strips and the rack assembly, a positive pole and a negative pole of each lithium battery being located correspondingly to at least one guiding strip;
   a plurality of guiding pieces, one end of each guiding piece being connected to each lithium battery, the other end of each guiding piece being fixed to the associated guiding strip, such that the lithium batteries are electrically connected to the guiding strips; and a plurality of safety units installed on the guiding pieces and corresponding in number to the number of lithium batteries and providing for cutting off the guiding pieces when a large current is produced;

the rack assembly being I-shaped and including a separating plate and two side racks, each side rack being formed with three threaded holes;

three guiding strips being disposed on each side of the rack assembly, that is, a mid guiding strip and two outer guiding strips, the ends of the guiding strips being attached to the two side racks of the rack assembly by screws, and each guiding strip being formed with a plurality of threaded holes;

the two poles of each lithium battery facing towards the mid guiding strip and the adjacent outer guiding strips; and one end of each guiding piece being connected to a pole of the associated lithium battery, the other end of each guiding piece being locked in position by a screw in the threaded hole of each guiding strip, such that the lithium batteries are connected in parallel.

2. A battery assembly as claimed in claim 1 further comprising a plurality of insulators, wherein the insulators are sheet-shaped and are fixed between the guiding strips connected to the positive poles of the lithium batteries and the guiding strips connected to the negative poles of the lithium batteries.

3. A battery assembly as claimed in claim 1 further including a box, wherein the box is provided for accommodating the rack assembly, and the polar heads are disposed outside of the box.

4. A battery assembly as claimed in claim 1, wherein the lithium batteries are connected in pairs in series and then parallelly connected to the guiding strips.

5. A battery assembly as claimed in claim 4, wherein the serially connected lithium batteries are connected by the guiding pieces.

6. A battery assembly as claimed in claim 1, wherein the guiding pieces are made of copper, or nickel, or gold, or silver.

* * * * *